United States Patent [19]
Roberts

[11] 3,941,098
[45] Mar. 2, 1976

[54] ROTARY ENGINE WITH FUEL SUPPLY THROUGH ROTOR

[75] Inventor: Thomas C. Roberts, Ridgewood, N.J.

[73] Assignee: Curtiss-Wright Corporation, Wood-Ridge, N.J.

[22] Filed: Mar. 31, 1975

[21] Appl. No.: 563,641

[52] U.S. Cl. .............................. 123/8.13; 418/188
[51] Int. Cl.² ......................................... F02B 53/02
[58] Field of Search................ 123/8.11, 8.13, 8.09; 418/188

[56] References Cited
UNITED STATES PATENTS

| | | | |
|---|---|---|---|
| 2,988,065 | 6/1961 | Wankel................................ | 418/188 |
| 3,246,636 | 9/1966 | Bentele.............................. | 123/8.09 |
| 3,255,737 | 6/1966 | Nallinger........................... | 123/8.09 |
| 3,344,778 | 10/1967 | Bensinger ..................... | 123/8.13 X |
| 3,387,595 | 6/1968 | Bentele.............................. | 123/8.09 |
| 3,858,558 | 1/1975 | Hart................................... | 123/8.13 |

Primary Examiner—C. J. Husar
Assistant Examiner—Leonard Smith
Attorney, Agent, or Firm—Victor D. Behn; Arthur Frederick

[57] ABSTRACT

A rotary combustion engine designed for operation as a stratified charge engine in which a relatively lean fuel-air mixture is supplied to each engine working chamber through the main air intake port and in which just prior to combustion in each engine working chamber, a relatively-rich, high-pressure, fuel-air mixture is supplied to each working chamber through individual passages in the rotor for each working chamber.

7 Claims, 4 Drawing Figures

ROTARY ENGINE WITH FUEL SUPPLY THROUGH ROTOR

BACKGROUND OF THE INVENTION

The invention relates to rotary internal combustion engines of the type disclosed in U.S. Pat. No. 2,988,065 and particularly to such an engine designed for operation as a stratified charge engine. Prior stratified charge rotary combustion engines are disclosed in U.S. Pat. Nos. 3,246,636, 3,387,595, 3,344,778, 3,508,530 and 3,805,747.

The problem of pollution resulting from exhaust emission discharge by internal combustion engines is one of the major problems facing modern society. One of the proposed approaches for minimizing this problem is to design the engine for operation with a stratified charge. By stratified charge operation it is meant engine operation with the fuel-air mixture or charge being non-uniformly distributed in each working chamber so that the chamber has at least one region in which the fuel-air mixture is relatively rich at the time combustion is initiated in the chamber. Various types of stratified charge engine configurations have been proposed in the past. To be successful, the stratified charge engine configuration must be able to significantly reduce all three of the major harmful constituents in the engine exhaust; namely, the carbon monoxides, the hydrocarbons and the nitrogen oxide compounds. In addition, the exhaust emission reduction must be achieved without any serious adverse effects on engine performance or engine fuel consumption.

Aforementioned stratified charge U.S. Pat. Nos. 3,387,595, 3,508,530 and 3,805,747 all disclose stratified charge rotary combustion engines in which the engine is provided with an auxiliary chamber in the engine housing and in which combustion is initiated. In such stratified charge rotary combustion engines the burning combustion gases are transferred from the auxiliary combustion chamber through a relatively small discharge passage into the main combustion chamber. The losses associated with this transfer of the burning combustion gases necessarily results in a reduction in engine performance and fuel consumption.

U.S. Pat. No. 3,246,636 discloses a stratified charge rotary combustion engine in which fuel is discharged directly into the engine working chambers at a point adjacent a spark plug for immediate ignition of the fuel by the plug. Although this stratified charge engine configuration shows considerable promise, difficulty has been experienced in providing satisfactory operation over the entire range of engine output and speed.

U.S. Pat. No. 3,344,778 shows a stratified charge rotary engine configuration in which an auxiliary combustion chamber in effect is formed in each working face of the rotor and into which fuel is discharged directly from the engine housing. With this latter configuration, all the engine fuel is supplied to each of the auxiliary chambers in the rotor faces and, therefore, it is difficult to achieve adequate mixture of air with this fuel in order to achieve complete combustion.

SUMMARY

An object of the invention resides in the provision of a novel and improved stratified charge rotary engine configuration which not only can produce a significant reduction in the various harmful constituents in the engine exhaust but also can accomplish this reduction without material adverse effects on engine performance and fuel consumption.

A further object of the invention resides in the provision of a stratified charge rotary engine configuration in which a relatively lean fuel-air mixture is supplied to each engine working chamber through the main intake port of the engine and in which a relatively rich fuel-air mixture is supplied to each working chamber through the rotor to a recess in the associated rotor working face so as to form a relatively rich fuel region in each working chamber at which combustion is initiated. More specifically, it is an object of the invention to provide a stratified charge rotary engine configuration in which a relatively lean fuel-air mixture is supplied to the engine working chambers through the main intake port of the engine and in which a relatively rich fuel-air mixture is supplied to the engine working chambers through a passage in the engine shaft and in the shaft eccentric portion which passage sequentially communicates with rotor passages each communicating with a recess in one of the rotor working faces. This relatively rich fuel-air mixture is supplied to each working chamber after the main charge therein has been substantially compressed whereby the fuel-air mixture in each working chamber is highly stratified at the time of ignition.

Rotary engine configurations are known in which fuel is supplied to the engine working chambers through the rotor. This broad feature is disclosed in aforementioned U.S. Pat. No. 2,988,065. In this patent, however, the fuel enters the working chambers through recesses in the engine side walls at the beginning and during each intake stroke of a working chamber. Accordingly, in this patent no attempt is made to stratify the fuel-air mixture in each working chamber. In connection with this feature in which fuel is supplied to the engine working chambers through the rotor, attention is also directed to U.S. Pat. No. 3,255,737. This latter patent discloses a rotary engine in which fuel is supplied to the engine shaft from a fuel injection pump, the fuel being transmitted through a passage in the engine shaft to a passage in the shaft eccentric portion which latter passage sequentially communicates with passages in the rotor, there being one rotor passage for each rotor working face. Unlike the present invention, however, in this latter prior patent, all the fuel is supplied to the engine working chambers through said shaft and rotor passages and this fuel is supplied to each working chamber during its intake phase. Accordingly, U.S. Pat. No. 3,255,737 also does not attempt to stratify the fuel charge in each working chamber.

Other objects of the invention will become apparent upon reading the following detailed description in connection with the drawings.

DESCRIPTION OF PREFERRED EMBODIMENT

Figure 1:
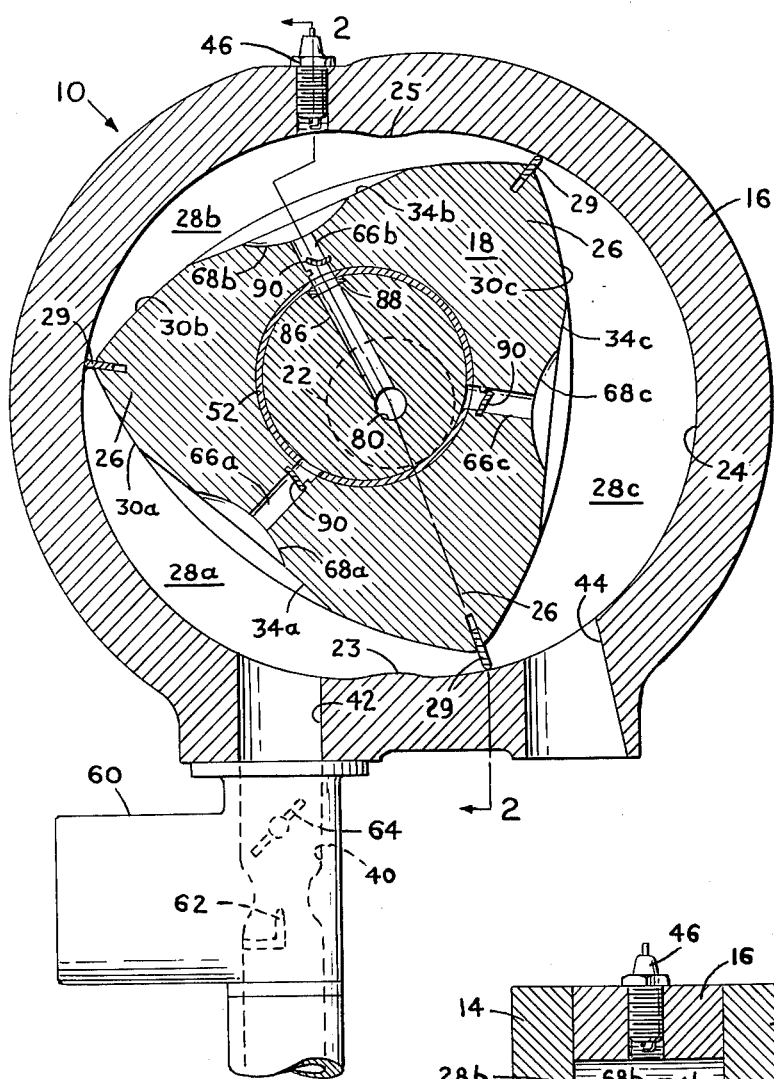
FIG. 1 is a transverse sectional view of a rotary engine embodying the invention and showing a portion of the engine shaft in perspective.

Referring to FIG. 1, a rotating combustion engine is schematically indicated at 10. The engine 10 comprises an outer body or housing consisting of two axially spaced end housings 14 and an intermediate or rotor housing 16, the housings being secured together to form the engine housing cavity therebetween. An inner body or rotor 18 is journaled for rotation within said housing cavity on an eccentric portion 20 of a shaft 22 which extends coaxially through and is supported by bearings in the housings 14. The axis of the shaft 22 is perpendicular to the inner walls of the end housings 14.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 (separately identified by reference numbers 28a, 28b and 28c) between the rotor 18 and the housings 14 and 16. For this purpose, each of the rotor apex portions is provided with a seal 29 which extends across the rotor between the inner walls of the end housings 14 and the rotor also has suitable seals (not shown) on its end faces for sealing contact with the inner walls of the end housing 14.

The triangular rotor 18 has three working faces 30 (separately identified by reference numbers 30a, 30b and 30c) each extending between a pair of apex seals 29 with said faces 30a, 30b and 30c forming walls of working chambers 28a, 28b and 28c, respectively. The rotor working faces 30a, 30b and 30c are provided with a trough-like recess 34a, 34b and 34c, respectively.

An air intake passage 40 supplies air to an air intake port 42 formed in the intermediate housing 16 and disposed adjacent to and on one side of the lobe junction 23 of the two lobes of the trochoidal surface 24. Similarly, an exhaust port 44 is formed in the intermediate housing 16 adjacent to butt on the opposite side of the lobe junction 23 from the intake port 42. The engine combustion is initiated in the engine working chambers in the vicinity of the other junction 25 of the two lobes of the trochoidal surface 24 and preferably by a spark plug 46.

The rotor 18 has an internal gear 50 secured thereto at one end face of the rotor, said gear being formed on a bushing 52 secured to and fitted within the rotor hub. The rotor gear 50 meshes with a fixed external gear 54 secured to the adjacent housing end wall 14. The gears 50 and 54 thereby control the relative rotation of the engine rotor 18. As is conventional in such engines having a two lobed epitrochoid 24, the ratio of the pitch circles of the gears 50 and 54 is 3:2 whereby the rotative speed of the shaft 22 about its axis is equal to three times the rotative speed of the rotor about its axis.

The engine structure so far described is conventional and is generally similar to that disclosed in the aforementioned prior patents. Reference is made to said prior patents for further details of such an engine including, for example, details of the rotor seals. With such an engine, during engine operation and with the rotor rotating clockwise as viewed in FIG. 1, the volume of each working chamber 28a, 28b and 28c periodically increases from a minimum volume condition, when it is located adjacent to the lobe junction 23 and open to the intake port 42, to a maximum volume condition and closes to the intake port 42 and then said chamber decreases in volume to compress its intake charge until the chamber again reaches a minimum volume condition, but this time at the lobe junction 25. Thereafter, the volume of said chamber again increases to a maximum and then decreases to a minimum as the chamber opens to the exhaust port 44 at the lobe junction 23 to complete the cycle.

With the present invention the intake passage 40 is provided with a carburetor 60 for supplying fuel to the intake passage through a nozzle 62 in accordance with the magnitude of the air flow through this passage. A throttle valve 64 is provided in the intake passage 40 for controlling the air flow through this passage into the engine working chambers. The carburetor 60 is set to provide a relatively lean fuel-air mixture of the charge supplied through the intake port 42 to each working chamber. That is, the carburetor is set so that the fuel-air mixture of the intake charge supplied through the intake port 44 not only contains less fuel than in a stoichiometric fuel-air mixture but is too lean for ready ignition by the spark plug 46.

In accordance with the present invention, additional fuel is supplied to each working chamber 28a, 28b and 28c by supplying a fuel-rich mixture through individual rotor passages 66, separately designated 66a, 66b and 66c respectively. These three individual rotor passages 66a, 66b and 66c are uniformly spaced about the axis of the rotor and terminate at the bottom of the trough-like recesses 34a, 34b and 34c in the rotor working faces having circular depressions 68a, 68b and 68c respectively at which the rotor passages 66a, 66b and 66c respectively terminate. As illustrated, each of the rotor passages 66a, 66b and 66c terminate in the central portion of its associated rotor face. It may, however, be desirable for each said rotor passage to terminate closer to the leading or the trailing portion of its associated rotor face.

The fuel-rich mixture is supplied from a passage 70 under the control of a second carburetor 72 to which air under pressure is supplied by a supercharger or blower 74 preferably driven (by means not shown) from the engine shaft 22. Carburetor 72 includes a fuel nozzle 75 for supplying fuel to the passage 70 in accordance with the magnitude of the air flow through this passage. A throttle valve 76 is provided for controlling the air flow through the passage 70.

The fuel-rich supply passage 70 communicates once each revolution of the shaft 22 with a port or radial passage portion 78 at one end of a passage 80 extending through the shaft 22. A suitable seal element 82 secured to the fixed housing portion 84 containing the supply passage 70, is disposed between said housing portion and the shaft 22 so as to seal the discharge end of the supply passage 70 against leakage between said housing portion 84 and shaft 22. In this way the fuel-rich supply passage 70 is in communication with shaft passage 80 for a limited period once during each revolution of the shaft, the duration of said period being determined by the circumferential widths of the adjacent ends of the supply passage 70 and shaft passage portion 78.

The other end of the shaft passage 80 has a radial portion 86 extending to the periphery of the shaft eccentric portion 20 for sequential communication with the aforementioned individual rotor passages 66a, 66b and 66c. Thus, in the position of the engine rotor and shaft shown in FIG. 1, the shaft passage 86 is in communication with the rotor passage 66b. A suitable circular seal or gasket 88 is disposed around the discharge end of the shaft passage portion 86, said gasket 88 sealingly engaging the rotor 18 to seal the passage 86 against leakage between the shaft eccentric 20 and the rotor 18.

Before discussing the operation of the engine described, it must be borne in mind that the shaft 22 rotates about its axis at three times the speed of rotation of the rotor 18 about its axis.

Figure 2:
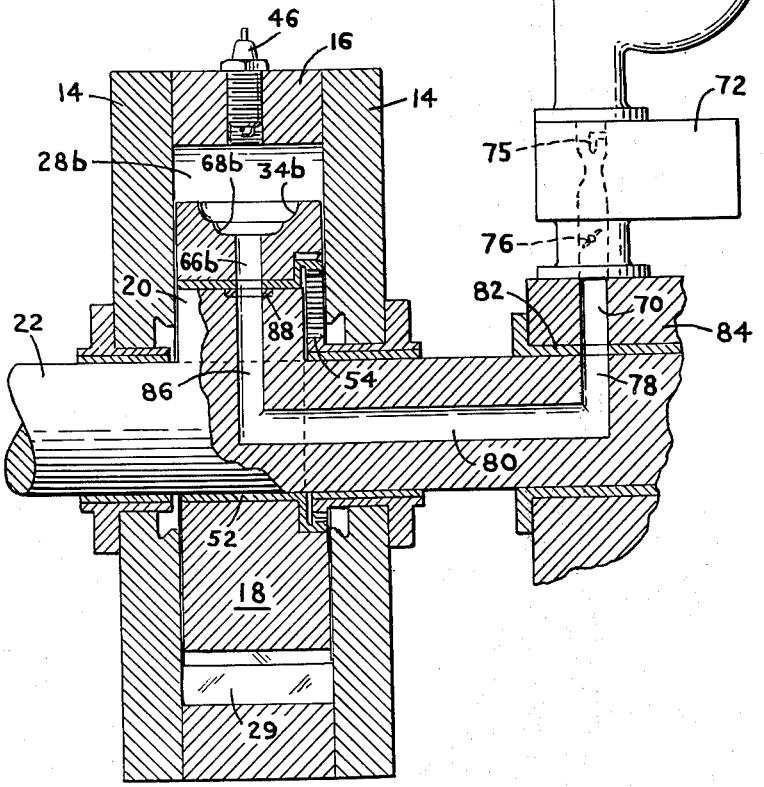
FIG. 2 is a sectional view taken along line 2—2 of FIG. 1.
Figure 3:
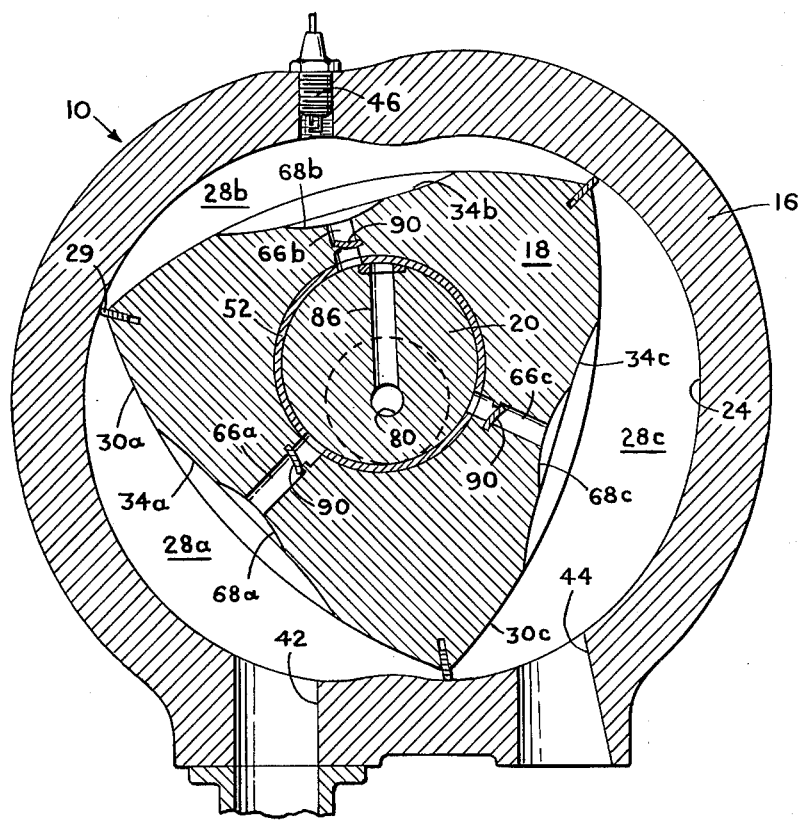
FIG. 3 is a view similar to FIG. 1 but showing the engine shaft rotated slightly from its position of FIG. 1.

With the engine described, each engine working chamber 28 is supplied with a lean combustion mixture or charge through the intake port 42. For example, with the engine 10 in the position of FIG. 1 a lean fuel-air charge is being drawn into the working chamber 28a. The individual rotor passage 66a for a fuel-rich charge is at this time closed at its end adjacent to the shaft eccentric 20. The corresponding lean fuel-air charge in the preceding working chamber 28b has already been substantially compressed by the engine operation so that the working chamber 28b is now positioned somewhat before its top dead center position. Also, as shown in FIG. 1, the individual rotor passage 66b is now aligned with the fuel-rich supply passage 86 and at the same time as seen in FIG. 2, the other end or portion 78 of the shaft passage is now aligned with the fixed supply passage 70 for the relatively rich fuel-air mixture. Accordingly a rich fuel-air mixture is at this time being supplied to the working chamber 28b through its individual rotor passage 66b to the rotor recess 34b for said working chamber particularly to its recessed depression 68b. Upon slight further rotation (clockwise) the shaft passage 86 moves beyond the rotor passage 66b (because of the three times faster shaft speed) to the position shown in FIG. 3. At this point the rotor passage 66b is now closed at the shaft eccentric 20 and the depression 68b is directly under the spark plug 46. The spark plug is now energized thereby igniting the fuel-rich mixture in the region directly under the spark plug particularly the fuel-rich mixture in the depression 68b. The burning of this fuel-rich mixture ignites the lean fuel-air mixture which had previously been supplied to and compressed in the working chamber 28b. Thus, the fuel-rich mixture supplied through the rotor passage 66b functions as a light-off charge to ignite the lean fuel-air mixture or main charge supplied to the working chamber 28b through the intake port 42, this main mixture being too lean for ready ignition by a spark plug.

A suitable check valve, for example of the reed type and schematically indicated at 90, may be provided in each of the passages 66a, 66b and 66c to prevent blow-back of the combustion gas pressures in the associated working chamber. When a check valve 90 is provided in each of said passages 66, the spark plug 46 can be energized to ignite the charge in a particular working chamber before the associated rotor passage 66 is completely closed to the shaft passage 86 at the shaft eccentric 20.

Figure 4:
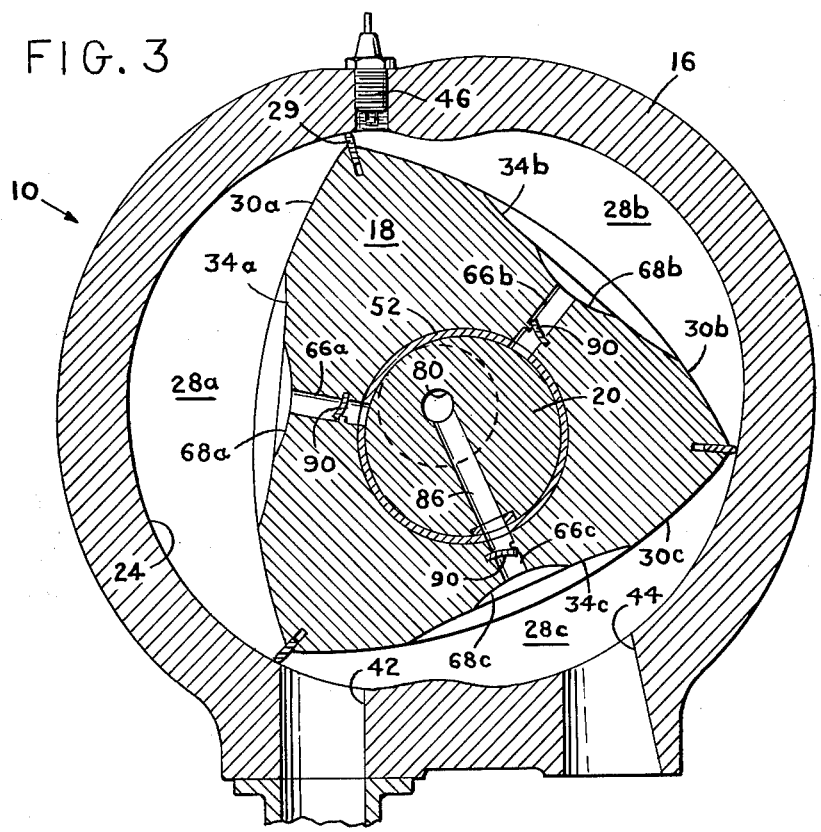
FIG. 4 is another view similar to FIG. 1 but showing the shaft rotated 180° from its position of FIG. 1.

In FIG. 1 the working chamber 28c is exhausting through the exhaust port 44 and as shown its rotor passage 66c is closed at the shaft eccentric. FIG. 4 shows the position of the rotor 18 and shaft 22 after the shaft has turned 180° clockwise from its position of FIG. 1. In the meantime, the rotor has turned only 60°. As a result of this rotation, the individual rotor passage 66c is now aligned with the shaft passage portion 86.

However, the other end or port portion 78 of the shaft portion 80 is now also turned 180° from its position of FIGS. 1 and 2 and therefore is now out of alignment with the fuel-rich mixture supply passage 70. Hence, in the position of FIG. 4, the fuel-rich mixture supply passage 70 is cut off from the shaft passage 80. Thus, no fuel-rich mixture is at this time supplied through the shaft passage 80 to the rotor passage 66c. When the shaft 22 has turned still another 180° the rotor 18 and shaft 22 are again in their positions of FIG. 1 but working chamber 28a would now be in a position previously occupied by working chamber 28b in FIG. 1.

It is apparent that only when the shaft 22 and rotor 18 are in their positions of FIG. 1, is the relatively rich fuel mixture passage 70 in communication with one of the individual rotor passages 66. Because of the relative rotation between the shaft 22 and the fixed supply passage 70, the radial portion 78 of the shaft passage 80 functions as a valve so that the supply passage 70 is in communication with the shaft passage 80 only once in each revolution of each shaft. Likewise, because of the relative rotation between the shaft 22 and the rotor 18, the radial portion 82 of the shaft passage 80 communicates with the rotor passages 66 twice in each revolution of such shaft but only at one of these times (when the rotor and shaft are in the positions of FIG. 1) is the supply passage 70 also in communication with the shaft passage 80.

From the foregoing description it is clear that the rotary engine 10 of the present invention has essentially the same cycle of operation of prior art rotary engines. However, the engine 10 of the present invention is capable of operating with the charge in each working chamber having a substantially leaner overall fuel-air ratio than in prior art rotary engines. This is so because a relatively rich fuel-air mixture is delivered to each combustion chamber by the rotor passages 66 directly in the vicinity of the spark plug just prior to the initiation of combustion. The ignition of this relatively rich fuel-air mixture is effective to ignite the lean or main fuel-air mixture already compressed in the working chamber. Because the relatively rich fuel-air mixture or light-off charge is already mixed with air as it is introduced into a working chamber 28, because the light-off charge is introduced into each working chamber immediately adjacent to the spark plug 46, and because the spark plug 46 is energized promptly after the light-off charge has been introduced into a working chamber (that is before the charge has had an opportunity to disperse) the light-off charge is readily ignited by the spark plug 46 and therefore ready ignition of the entire charge in each working chamber is assured even though the light-off charge is quite small and even though the overall fuel-air ratio of the entire mixture in each working chamber at the time of ignition is very lean.

The power output of the engine 10 is regulated by means of the throttle valve 64 for the main carburetor 60. As the power output of the engine is increased by opening adjustments of said throttle valve 64, the quantity of the relatively rich fuel-air mixture or charge supplied through the rotor shaft passage 80 to the individual working chambers 28 preferably is likewise increased by opening adjustments of the throttle valve 76 for the auxiliary carburetor 72.

It should be understood that this invention is not limited to the specific details of construction and arrangement thereof herein illustrated and that changes and modifications may occur to one skilled in the art without departing from the spirit or scope of the invention.

What is claimed is:

1. A rotary combustion engine comprising:
   a. an outer body having an internal cavity, the peripheral surface of which has a multilobe profile and also having an air intake port and a combustion gas exhaust port,
   b. a shaft coaxial with said cavity and having a cylindrical eccentric portion disposed within said cavity,
   c. an inner body of generally polygonal profile and journaled on said eccentric portion for rotation within said outer body relative to said outer body and shaft, the apex portions of said inner body having sealing cooperation with said peripheral surface to define a plurality of working chambers which vary in volume in response to relative rotation of said inner and outer bodies with each peripheral surface portion of said inner body extending between adjacent apex portions forming a working face for the adjacent working chamber,
   d. first passage means for supplying a relatively lean fuel-air mixture to said working chambers through said intake port,
   e. second passage means for supplying a relatively fuel-rich charge to each working chamber after the lean mixture therein has been substantially compressed, said second passage means including individual passages in the inner body, one for each working chamber, with each of said individual passages having its downstream end terminating at the working face of its associated working chamber, and
   f. ignition means for initiating combustion in each working chamber in the region of said chamber containing said relatively rich charge.

2. A rotary combustion engine as claimed in claim 1 and in which said second passage means includes a passage through the shaft and its eccentric portion with the eccentric portion end of said shaft passage being disposed for sequential communication with said individual passages of the inner body as a result of relative rotation between said inner body and shaft.

3. A rotary combustion engine as claimed in claim 2 and in which said second passage means also includes a fixed supply passage for the fuel rich charge with the downstream end of said supply passage being disposed for a limited period of communication with the other end of said shaft passage once during each revolution of the shaft.

4. A rotary combustion engine as claimed in claim 3 in which said supply passage is in communication with an end of said shaft passage at the same time that the eccentric portion end of said shaft passage is in communication with one of said individual passages of the inner body and at the time the charge in working chamber associated with said individual passage has been substantially compressed.

5. A rotary combustion engine as claimed in claim 4 including a blower for supplying compressed air to said supply passage and also includes means for supplying fuel to said supply passage to provide said relatively fuel-rich charge.

6. A rotary combustion engine as claimed in claim 1 and in which each of said individual passages of the inner body terminates at the bottom of a recess in the working face of its associated working chamber.

7. A rotary combustion engine as claimed in claim 1 and in which each recess in a working face of the inner body has a depressed portion of greater depth and with the associated individual passage terminating at the bottom of said depression.

* * * * *